(12) United States Patent
Yoshida et al.

(10) Patent No.: US 10,648,477 B2
(45) Date of Patent: May 12, 2020

(54) ROTARY MACHINE STATE OBSERVATION DEVICE, ROTARY MACHINE, AND ROTARY MACHINE STATE OBSERVATION METHOD

(71) Applicant: Mitsubishi Heavy Industries, Ltd., Tokyo (JP)

(72) Inventors: Tadashi Yoshida, Tokyo (JP); Shinji Ogawa, Tokyo (JP); Koichi Sakamoto, Nagasaki (JP); Yukihiro Iwasa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 59 days.

(21) Appl. No.: 15/533,980

(22) PCT Filed: Oct. 6, 2015

(86) PCT No.: PCT/JP2015/078257
§ 371 (c)(1),
(2) Date: Jun. 7, 2017

(87) PCT Pub. No.: WO2016/092945
PCT Pub. Date: Jun. 16, 2016

(65) Prior Publication Data
US 2017/0342993 A1    Nov. 30, 2017

(30) Foreign Application Priority Data
Dec. 9, 2014    (JP) .................................. 2014-249144

(51) Int. Cl.
*F04D 27/00* (2006.01)
*G01B 7/14* (2006.01)
(Continued)

(52) U.S. Cl.
CPC .............. *F04D 27/001* (2013.01); *F02C 7/00* (2013.01); *F04D 29/284* (2013.01);
(Continued)

(58) Field of Classification Search
CPC ... F04D 27/001; F04D 29/284; F04D 29/4206
See application file for complete search history.

(56) References Cited

U.S. PATENT DOCUMENTS

2010/0191502 A1* 7/2010 Ren ....................... F01D 21/003
702/155
2013/0311130 A1 11/2013 Horton et al.

FOREIGN PATENT DOCUMENTS

| JP | 06-313711 | 8/1994 |
| JP | 06-241880 | 9/1994 |

(Continued)

OTHER PUBLICATIONS

Written Opinion of the International Searching Authority, International Application No. PCT/JP2015/078257, dated Nov. 17, 2015, 7 pgs.

(Continued)

*Primary Examiner* — Kevin A Lathers
(74) *Attorney, Agent, or Firm* — Berkeley Law & Technology Group, LLP

(57) ABSTRACT

A state observation device (30) uses an ADC (37) to digitize a detection signal from a gap sensor (21) at a low-speed sampling period and uses a separation unit (38) to separate the digitized detection signal into vane detection signals considered to be for the detection of a vane of a compressor impeller and non-vane detection signals considered not to be for the detection of a vane. Further, the determination unit (39) extracts a vane peak detection signal considered to be for a vane peak by comparing a vane detection signal with vane detection signals corresponding to other vanes and non-vane detection signals, and a shaft vibration and tip clearance are determined as states of the compressor impeller on the basis of the extracted vane peak detection signal. Thus, the state observation device (30) is capable of observ- (Continued)

ing the state of a rotary machine without carrying out high-speed sampling.

5 Claims, 7 Drawing Sheets

(51) Int. Cl.
*F02C 7/00* (2006.01)
*F04D 29/28* (2006.01)
*G01M 99/00* (2011.01)
*F04D 29/42* (2006.01)
*F02B 33/40* (2006.01)
*F02B 37/00* (2006.01)

(52) U.S. Cl.
CPC ........... *F04D 29/4206* (2013.01); *G01B 7/14* (2013.01); *G01M 99/00* (2013.01); *F02B 33/40* (2013.01); *F02B 37/00* (2013.01); *Y02T 10/144* (2013.01)

(56) References Cited

FOREIGN PATENT DOCUMENTS

| JP | 2010175542 | 8/2010 |
| JP | 2013-224847 | 10/2013 |

OTHER PUBLICATIONS

International Search Report, International Application No. PCT/JP2015/078257, dated Nov. 17, 2015, 4 pgs.

\* cited by examiner

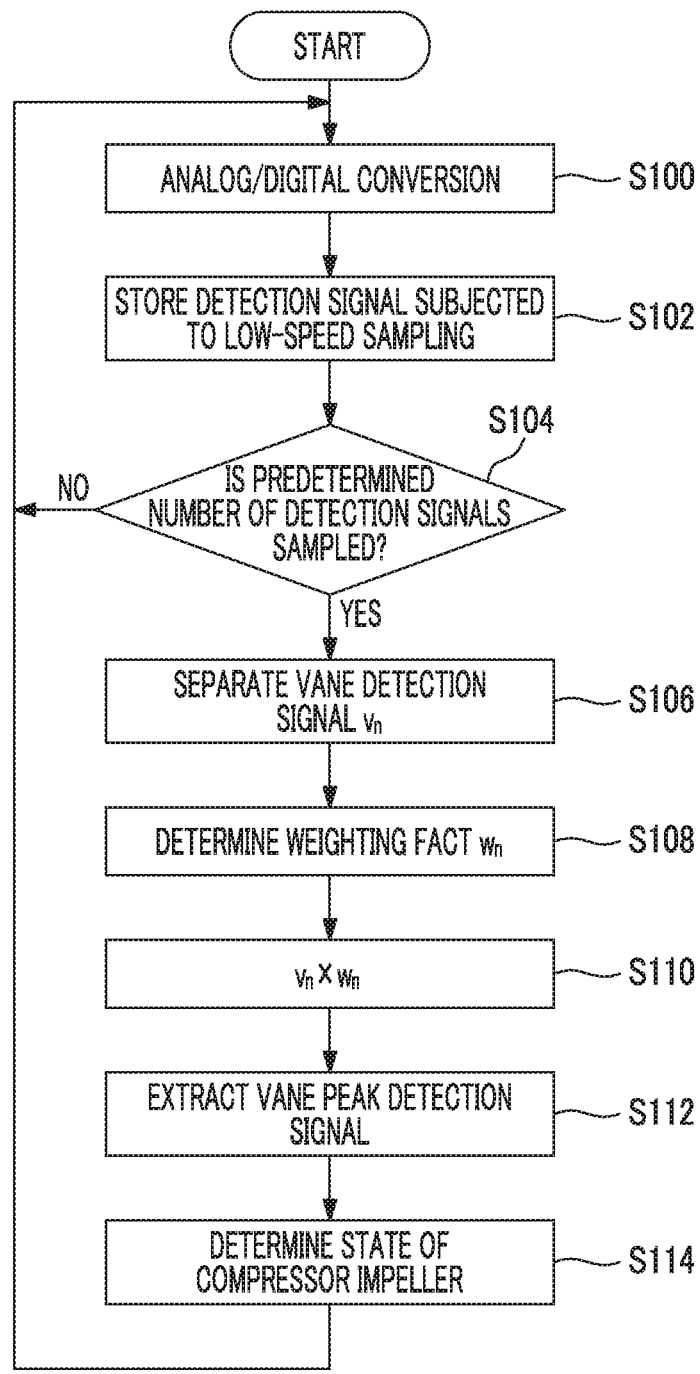

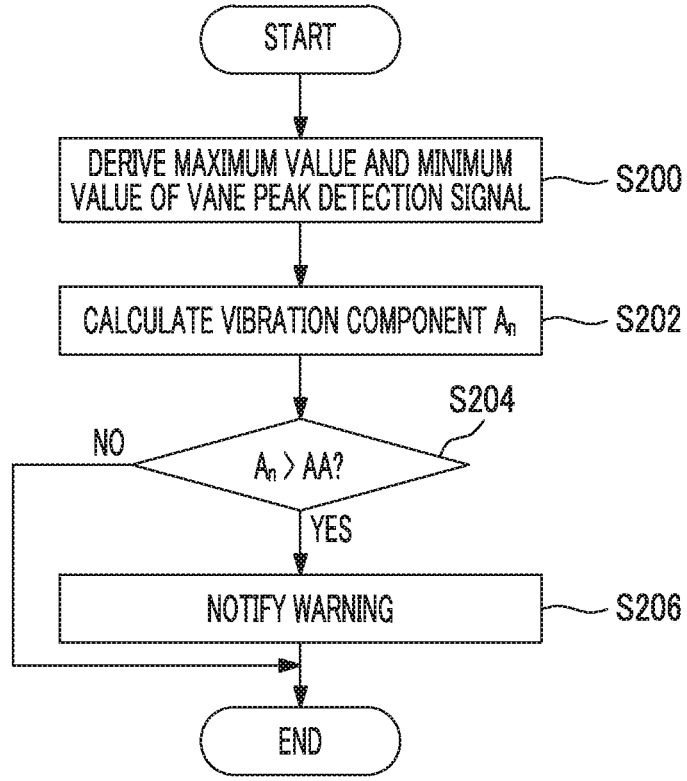
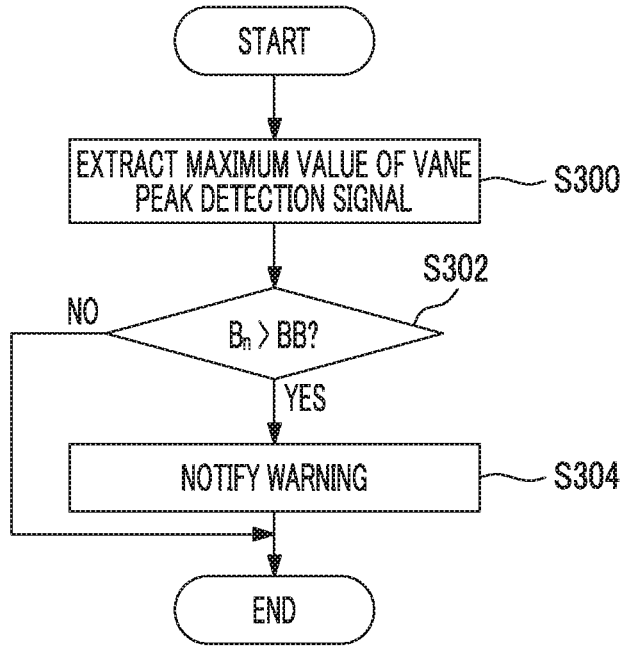

ROTARY MACHINE STATE OBSERVATION DEVICE, ROTARY MACHINE, AND ROTARY MACHINE STATE OBSERVATION METHOD

TECHNICAL FIELD

The present invention relates to a rotary machine state observation device, a rotary machine, and a rotary machine state observation method.

BACKGROUND ART

In a rotary machine such as a turbo machine, an impeller which integrally rotates with a rotor is provided. The impeller includes a plurality of vanes and is accommodated in a casing.

In addition, a predetermined amount of clearance is required between the vanes and the casing to reliably prevent contact between the vanes of the impeller and the casing.

However, during operation of the rotary machine, synchronous vibrations due to a rotation frequency of the rotor, backlash of a bearing portion which supports the rotor, non-synchronous vibrations due to turbulence or the like of a flowing fluid, or the like may occur. Accordingly, the vanes oscillate beyond the clearance due to the vibrations and the vanes are likely to come into contact with the casing.

In view of the above, a state observation device disclosed in PTL 1 for observing a state of a turbo machine measures a rotation speed of a rotating body which is an impeller, shaft vibrations, and a tip clearance which is a gap between the rotating body and a casing by one senor which outputs a signal synchronized with a rotation of the rotating body, stores vibration amplitude, an amplification factor, and the tip clearance for each rotation speed during an initial operation, and weights the vibration amplitude, the amplification factor, and the tip clearance. In addition, in a case these sums exceed a preset threshold value, the state observation device determines that the state of the turbo machine is in an abnormal state and issues a warning.

CITATION LIST

Patent Literature

[PTL 1] Japanese Unexamined Patent Application Publication No. 2013-224847

SUMMARY OF INVENTION

Technical Problem

In the state observation device disclosed in PTL 1, since the rotating body rotates at a high speed and a vane passes through the sensor at very short time intervals, for example, several microseconds, it is necessary to perform digitalization on an output signal of the sensor by high-speed sampling.

In order to realize high-speed sampling, an analog-digital converter which can perform high-speed sampling with high frequency characteristics is required, which generates an increase in a cost of the entire device.

The present invention is made in consideration of the above-described circumstances, and an object thereof is to provide a rotary machine state observation device, a rotary machine, and a rotary machine state observation method in which a state of the rotary machine can be observed without performing high-speed sampling.

Solution to Problem

In order to achieve the object, a rotary machine state observation device, a rotary machine, and a rotary machine state observation method of the present invention adopt the following means.

According to a first aspect of the present invention, there is provided a rotary machine state observation device, including: detection means for detecting a distance between an impeller of a rotary machine and the detection means, the detection means being provided at an interval in a radial direction between the impeller and the detection means; conversion means for digitizing a detection signal detected by the detection means at a predetermined sampling period; separation means for separating a detection signal digitized by the conversion means into a vane detection signal considered to be for detection of a vane of the impeller and a non-vane detection signal considered not to be for detection of the vane; and determination means for extracting a vane detection signal considered to be for a peak of the vane by comparing the vane detection signal with vane detection signals corresponding to other vanes and the non-vane detection signal and determining a state of the impeller on the basis of the extracted vane detection signal.

According to the present configuration, the detection means is provided at an interval in the radial direction between the impeller of the rotary machine and the detection means, and the detection signal detected by the detection means is digitized by the conversion means at a predetermined sampling period.

Here, for example, an impeller of a turbo machine or the like rotates at a high speed such as 3,000 rpm. Accordingly, in order to accurately detect the distance between the impeller and the detection means, preferably, the conversion means digitizes the detection signal by high-speed sampling. Here, the high-speed sampling is a sampling period at which a peak of the vane can be clearly determined by performing sampling on one vane three times or more, for example. However, in order to perform the high-speed sampling, conversion means having high performance is required, or the like, which increases a cost.

Meanwhile, the detection signal is digitized for a non-high speed sampling period, for example, for a sampling period at which one vane can be detected only once or twice, and accordingly, the conversion means having high performance is not required.

Therefore, in the present configuration, the separation means separates the detection signal digitized by the conversion means into a vane detection signal considered to be for detection of the vane of the impeller and a non-vane detection signal considered not to be for detection of the vane. As an example of a separation method, a method of separating the detection signal using a predetermined threshold value is used.

However, if the detection signal is digitized at a sampling period which is performed on one vane approximately once or twice, the digitized vane detection signal does not necessarily indicate the peak of the vane, and a detection signal indicating a vane position deviated from the peak is likely to be digitized. In this way, in the vane detection signal digitized at the non-high speed sampling period, a detection result with respect to the peak of the vane and a detection result of the vane position deviated from the peak are mixed.

Accordingly, the determination means extracts a vane detection signal considered to be for a peak of the vane by comparing the vane detection signal with vane detection signals corresponding to other vanes and the non-vane detection signal. For example, as a comparison method, there is a method of calculating a height of the vane from a difference between each vane detection signal and the non-vane detection signal and extracting the vane detection signal considered to be for the peak of the vane on the basis of the height of the vane indicated by each vane detection signal.

Moreover, the determination means determines the state of the impeller on the basis of the extracted vane detection signal considered to be for the peak of the vane.

In this way, in the present configuration, by relatively comparing the vane detection signals of the plurality of vanes and the non-vane detection signals, the vane detection signal considered to be for the peak of the vane is extracted and the state of the impeller is determined. Accordingly, since it is enough for a detection signal indicating a distance to the vane to be sampled at least once for each vane, in the present configuration, it is possible to observe the state of the rotary machine without performing high-speed sampling.

In the first aspect, the determination means may less weight the vane detection signal as a deviation amount from the vane detection signal indicating the highest value increases.

In the present configuration, with respect to the determination of the state of the impeller, it is possible to decrease influences of the vane detection signal having a large deviation amount from the peak.

In the first aspect, the predetermined sampling period may be determined on the basis of a time interval at which one vane passes through a position facing the detection means.

In the present configuration, as a non-high speed sampling period, it is possible to determine an appropriate sampling period.

According to a second aspect of the present invention, there is provided a rotary machine, including: an impeller; a casing which accommodates the impeller; and the above-described state observation device.

According to a third aspect of the present invention, there is provided a rotary machine state observation method, including: a first step of detecting a distance between an impeller of a rotary machine and detection means by the detection means which is provided at an interval in a radial direction between the impeller and the detection means; a second step of digitizing a detection signal detected by the detection means at a predetermined sampling period; a third step of separating the digitized detection signal into a vane detection signal considered to be for detection of a vane of the impeller and a non-vane detection signal considered not to be for detection of the vane; and a fourth step of extracting a vane detection signal considered to be for a peak of the vane by comparing the vane detection signal with vane detection signals corresponding to other vanes and the non-vane detection signal and determining a state of the impeller on the basis of the extracted vane detection signal.

Advantageous Effects of Invention

According to the present invention, it is possible to observe the state of the rotary machine without performing high-speed sampling.

BRIEF DESCRIPTION OF DRAWINGS

FIG. 7 is a flowchart showing a flow of impeller state determination processing according to the embodiment of the present invention.

FIG. 8 is a flowchart showing a flow of shaft vibration determination processing according to the embodiment of the present invention.

FIG. 9 is flowchart showing a flow of tip clearance determination processing according to the embodiment of the present invention.

DESCRIPTION OF EMBODIMENTS

Hereinafter, embodiments of a rotary machine state observation device, a rotary machine, and a rotary machine state observation method according to the present invention will be described with reference to the drawings.

Figure 1:
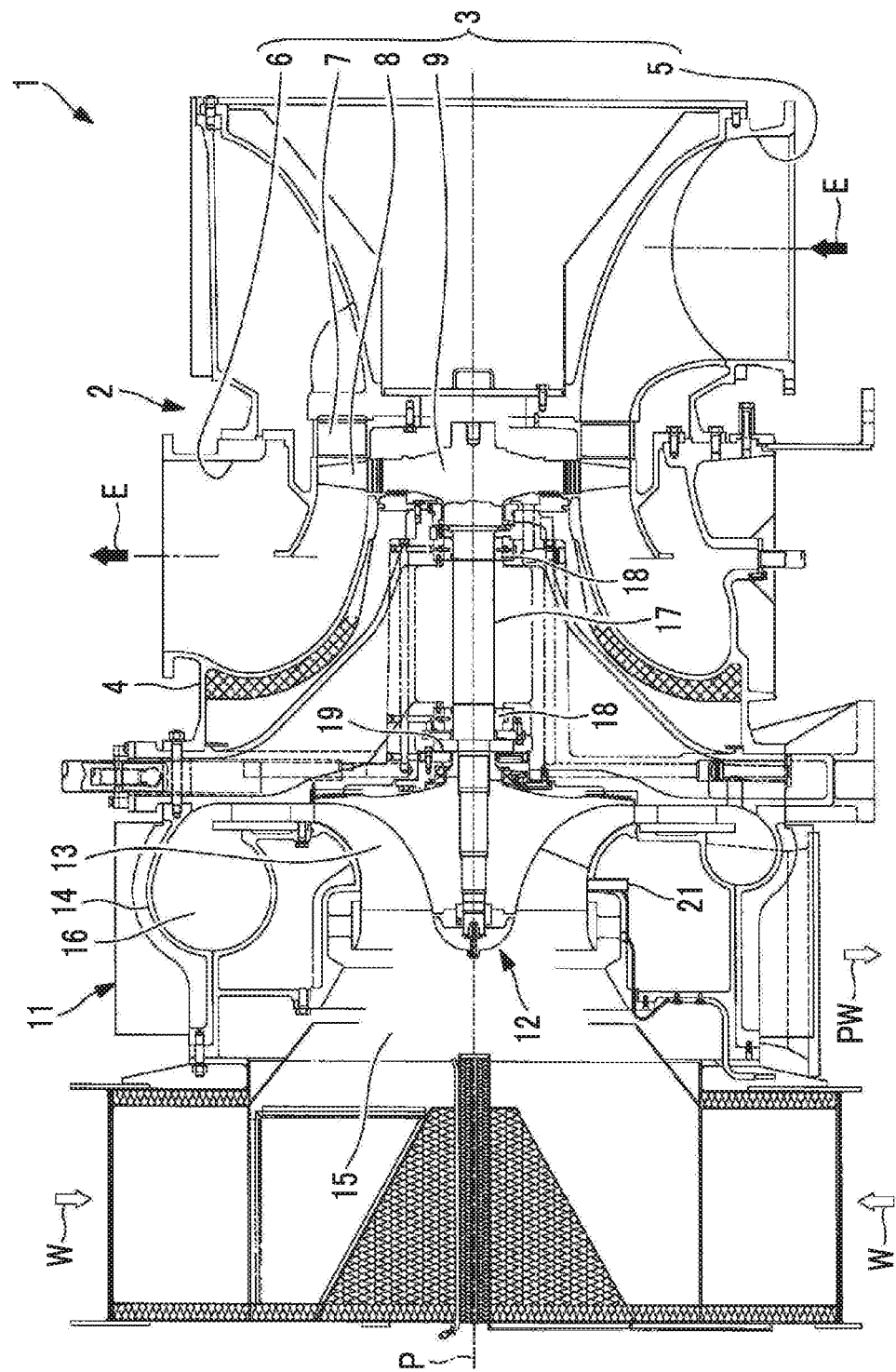
FIG. 1 is a configuration view of a turbocharger according an embodiment of the present invention.

FIG. 1 is a configuration view of a turbocharger 1 according to the present embodiment.

As shown in FIG. 1, the turbocharger 1 includes a turbine 2 which converts energy of an exhaust gas E of an engine into a rotation and a compressor 11 which is driven by the turbine 2.

The compressor 11 compresses suctioned air W to generate compressed air PW and forcibly feeds the compressed air PW to the engine.

The turbine 2 is configured of a turbine body 3, and a turbine casing 4 which covers the turbine body 3 from the outer peripheral side and includes an inlet passage 5 and an outlet passage 6 of the exhaust gas E.

The turbine body 3 includes stator vanes 7 which are attached to the turbine casing 4 and rotor vanes 8 which are attached to a disk 9 which rotates about an axis P.

The stator vanes 7 are provided to protrude from the turbine casing 4 to the inside in the radial direction of the axis P on a connection portion between the inlet passage 5 and the outlet passage 6, and a plurality of stator vanes 7 are disposed at intervals in a peripheral direction of the axis P.

The rotor vanes 8 are provided to protrude from an outer peripheral surface of the disk 9 toward the outside in the radial direction and are disposed between the stator vanes 7 at predetermined intervals on a downstream side (a left side on a paper surface of FIG. 1) of the stator vane 7.

The compressor 11 includes a compressor impeller 12 which is a rotating body which is rotatable about the axis P, and a compressor casing 14 which covers the compressor impeller 12 from the outer periphery.

Figure 2:
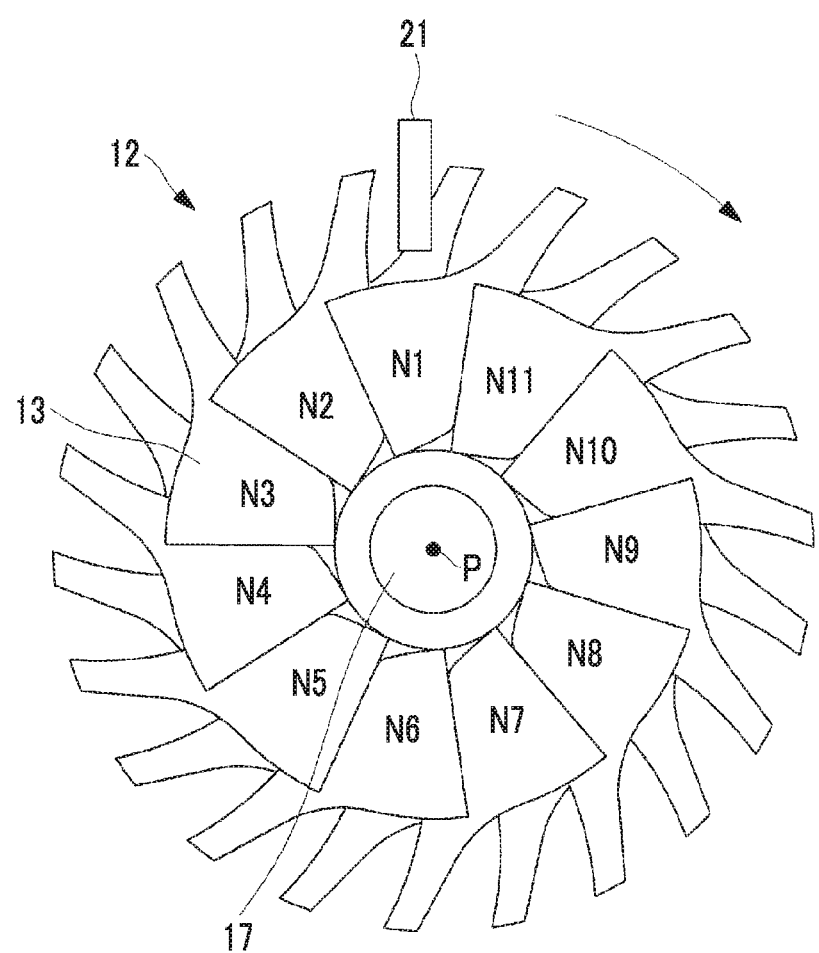
FIG. 2 is a configuration view of a vane according to the embodiment of the present invention.

The compressor impeller 12 is a centrifugal impeller which includes a plurality of vanes 13. As shown in FIG. 2, the vanes 13 are provided at predetermined intervals in the peripheral direction of the axis P, and for example, 11 vanes 13 are provided.

The compressor casing 14 includes an air inlet 15 through which the air W is suctioned and an outlet scroll 16 which discharges the compressed air PW compressed by the compressor impeller 12.

In addition, the compressor impeller 12 and the disk 9 are fitted to a rotor 17 which rotates about the axis P and integrally rotate about the axis P with each other. In addition, the rotor 17 is rotatably supported about the axis P by two radial bearings 18 and one thrust bearing 19.

In addition, as shown in FIG. 2, a gap sensor 21 is provided in the compressor casing 14. The gap sensor 21 is provided in the compressor casing 14 at a position facing the vanes 13 of the compressor impeller 12 and measures a distance to a shroud side tip of the vanes 13.

Figure 6:
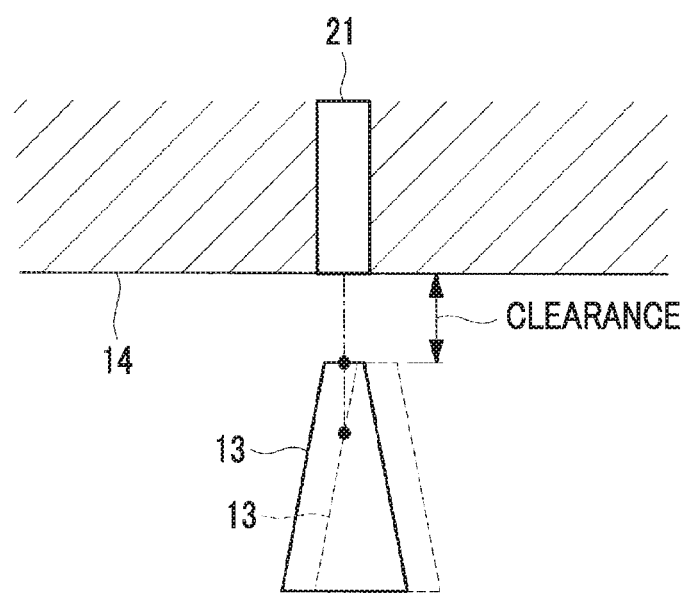
FIG. 6 is a schematic diagram showing an example of a vane detection position by the low-speed sampling according to the embodiment of the present invention.

For example, the gap sensor 21 according to the present embodiment is a non-contact displacement meter which uses an eddy current effect. In addition, for example, only one gap sensor 21 is provided in the compressor casing 14, and the gap sensor 21 is positioned at the same position as the inner peripheral surface of the compressor casing 14 (refer to FIG. 6).

Here, an operation principle of the displacement meter which uses the eddy current effect will be described. The displacement meter is configured of a coil which generates a high frequency magnetic flux, and detects a change of an eddy current generated on the surface of the vane 13 which is a measurement target as a change of impedance of the coil by a high frequency magnetic flux generated from the coil. That is, the change of the distance according to the passage of the vane 13 is detected by the change of the impedance of the coil, and the maximum output is obtained when the vane 13 is closest.

Figure 3:
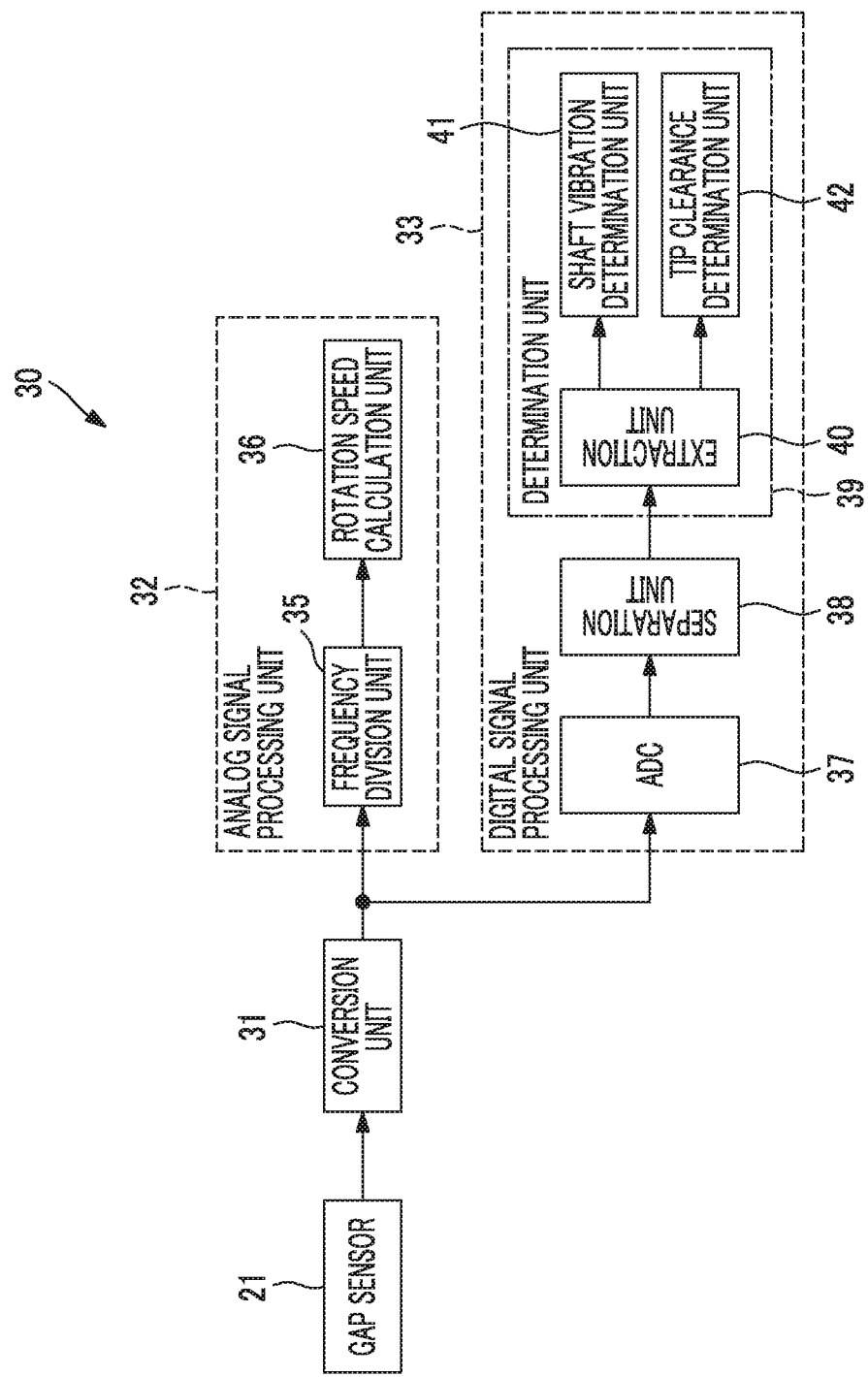
FIG. 3 is a block diagram showing an electrical configuration of a state observation device according to the embodiment of the present invention.

FIG. 3 is a block diagram showing an electrical configuration of a state observation device 30 according to the present embodiment.

The state observation device 30 includes the above-described gap sensor 21, a conversion unit 31, an analog signal processing unit 32, and a digital signal processing unit 33. In addition, the state observation device 30 acquires three values, that is, a rotation speed of the compressor impeller 12, a vibration of the compressor impeller 12, and a clearance between the compressor impeller and the compressor casing 14 based on the detection signal of the gap sensor 21, and determines the state of the compressor impeller 12.

Figure 4:
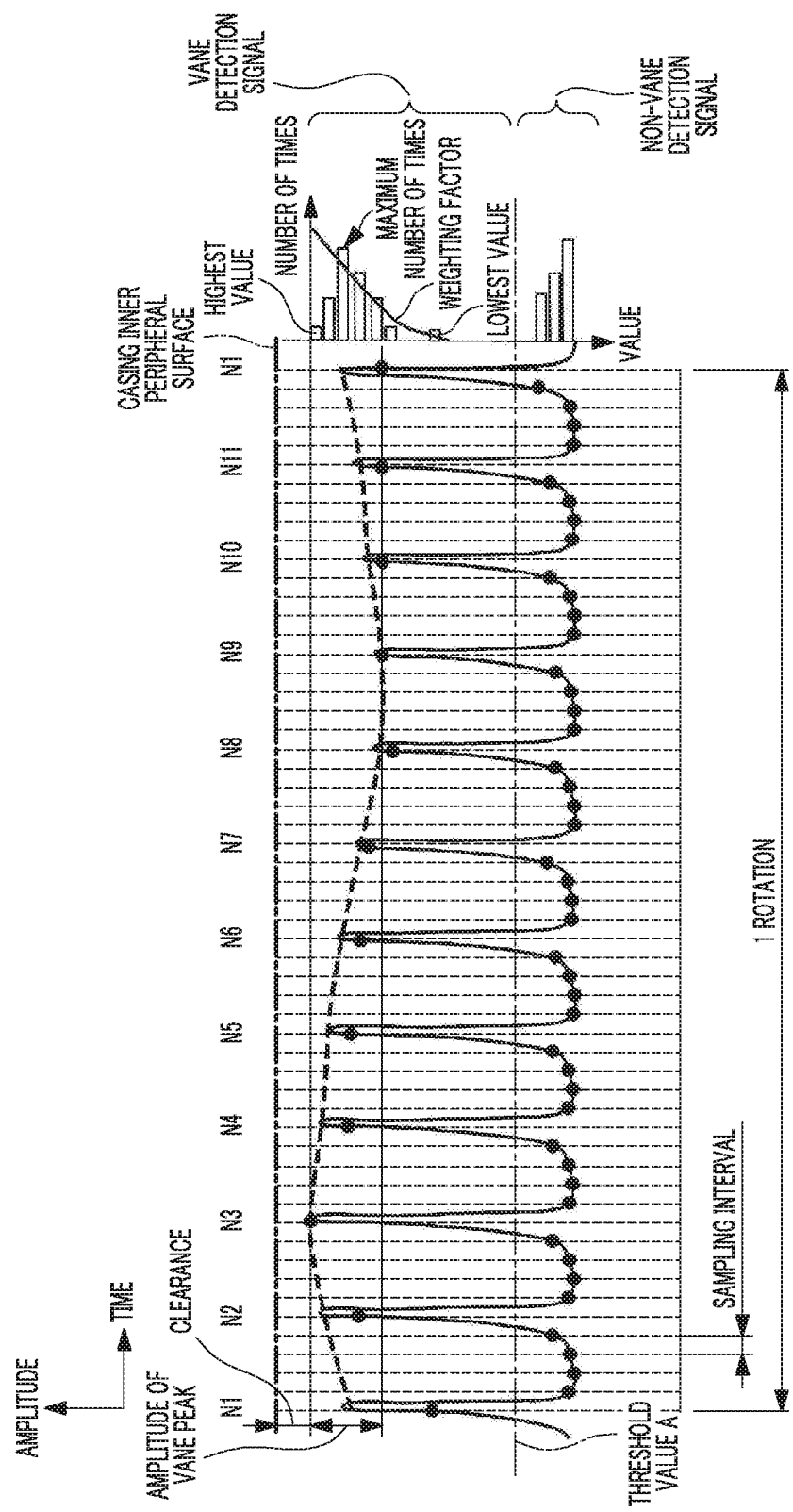
FIG. 4 is a schematic diagram showing a detection signal of a gap sensor according to the embodiment of the present invention.

Here, the detection signal (analog signal) output from the gap sensor 21 will be described with reference to FIG. 4. In FIG. 4, a horizontal direction indicates time, and a vertical direction indicates amplitude.

As shown in FIG. 4, when the gap sensor 21 faces each vane 13, the gap sensor 21 outputs a larger detection signal as a distance between the gap sensor 21 and the compressor impeller 12 decreases. That is, the detection signal which is periodically output from the gap sensor 21 has a waveform (solid line in FIG. 4) which has large amplitude when each vane 13 and the gap sensor 21 face each other and small amplitude at a position at which each vane 13 and the gap sensor 21 are separated from each other, specifically, at an intermediate point between adjacent vanes 13.

In addition, every time the compressor impeller 12 rotates once, peaks having the number of times (in the present embodiment, 11 times, and N1 to N11) corresponding to the number of vanes 13 are output from the gap sensor 21.

The detection signal indicated by the solid in FIG. 4 is output from the gap sensor 21 to the conversion unit 31.

For example, the conversion unit 31 includes an amplifier circuit which uses a transistor or the like, amplifies weak detection signals from the gap sensor 21, and outputs the amplified detection signals to the analog signal processing unit 32 and the digital signal processing unit 33.

The analog signal processing unit 32 includes a frequency division unit 35 and a rotation speed calculation unit 36.

The detection signal (analog signal) of the gap sensor 21 amplified by the conversion unit 31 is input to the frequency division unit 35, and the frequency division unit 35 divides the detection signal by a predetermined number of times (in the present embodiment, 11 times which is the same as the number of vanes 13) and outputs a rotation speed signal synchronized with the rotation speed of the compressor impeller 12.

The rotation speed calculation unit 36 counts the number of the rotation speed signals from the frequency division unit 35 so as to calculate the rotation speed of the compressor impeller 12.

The digital signal processing unit 33 includes an analog-digital convertor (hereinafter, referred to as "ADC") 37, a separation unit 38, and a determination unit 39.

The ADC 37 converts the detection signal output from the gap sensor 21 from an analog signal to a digital signal at a predetermined sampling period. For example, in FIG. 4, broken lines indicate sampling intervals, and black dots on an analog waveform indicate detection signals sampled by the ADC 37.

The separation unit 38 separates the detection signal digitalized by the ADC 37 into a vane detection signal considered to be for detection of the vane 13 and a non-vane detection signal considered not to be for detection of the vane 13. In addition, the non-vane detection signal is a detection signal which is generated by detecting the rotor 17 or the root of the vane 13 instead of the vane 13.

A threshold value A shown FIG. 4 is for separating the vane detection signal and the non-vane detection signal, and the detection signal equal to or more than the threshold value A is separated as the vane detection signal and the detection signal less than the threshold value A is separated as the non-vane detection signal by the separation unit 38.

The determination unit 39 extracting a vane detection signal considered to be for a peak (hereinafter, referred to as a "vane peak") of the vane 13 by relatively comparing the vane detection signal with vane detection signals with respect to other vanes 13 and the non-vane detection signal and determines the state of the compressor impeller 12 on the basis of the extracted vane detection signal.

The determination unit 39 includes an extraction unit which performs the extraction, a shaft vibration determination unit 41, and a tip clearance determination unit 42.

The shaft vibration determination unit 41 determines the vibration state of the compressor impeller 12.

The tip clearance determination unit 42 determines a state of a clearance (refer to FIG. 4) between the maximum value of the vane peak of the compressor impeller 12 and an inner peripheral surface of the compressor casing 14.

In addition, for example, the separation unit 38 and the determination unit 39 included in the digital signal processing unit 33 are configured of a Central Processing Unit (CPU), a Random Access Memory (RAM), a Read Only Memory (ROM), a computer readable storage medium, or the like. In addition, for example, a series of processing of realizing various functions is stored in a storage medium or the like in the form of a program, the CPU causes the RAM or the like to read out the program to perform information processing/calculation, and the various functions are realized. In addition, the program may be installed in a ROM or other storage mediums in advance, may be provided in a state of being stored in a computer readable storage medium, or may be distributed via wired or wireless communication means. The computer readable storage medium is a magnetic disk, a magneto-optical disk, a CD-ROM, a DVD-ROM, a semiconductor memory, or the like.

Here, for example, the compressor impeller 12 rotates at a high speed such as 3,000 rpm. Accordingly, in order to accurately detect the distance between the compressor impeller 12 and the compressor casing 14, preferably, the ADC digitizes the detection signal at high-speed sampling. Here, the high-speed sampling is a sampling period at which a peak of the vane can be clearly determined by performing sampling on one vane 13 three times or more, for example. However, in order to perform the high-speed sampling, the ADC having high performance is required, or the like, which increases a cost.

Accordingly, in the state observation device 30 according to the present embodiment, the detection signal is digitized for a non-high speed sampling period, for example, for a sampling period (hereinafter, referred to as "low-speed sampling") at which one vane 13 can be detected only once or twice, and accordingly, the ADC having high performance is not required.

The sampling period by the ADC 37 according to the present embodiment is determined on the basis of the time interval at which one vane 13 passes through a position facing the gap sensor 21.

The following Expressions (1) to (4) are examples of calculation expressions for determining the low-sampling period by the ADC 37 according to the present embodiment.

[Expression 1]
$$V = \frac{D}{2} \times \omega \quad (1)$$

[Expression 2]
$$V = \frac{D}{2} \times \left(2 \times \pi \times \frac{N}{60}\right) \quad (2)$$

[Expression 3]
$$F = \left(\pi \times \frac{D}{n \cdot V}\right)^{-1} \quad (3)$$

[Expression 4]
$$Fs = 10 \times F \quad (4)$$

Expressions (1) and (2) are calculation expressions with respect to a peripheral speed V (m/s) of a tip portion of the vane 13, D is an outer peripheral diameter (m) of the compressor impeller 12 corresponding to an installation position of the gap sensor 21, ω is an angular velocity (rad/s), and N is a rotation speed (rpm) of the compressor impeller 12. In addition, ω is converted like Expression (2) using the rotation speed N (rpm) of the compressor impeller 12.

In addition, Expression (3) is a calculation expression with respect to a frequency F (Hz, hereinafter, referred to as an "inter-vane pass frequency") at which one vane 13 passes through the gap sensor 21 and n is the number of vanes 13.

In addition, Fs is a sampling frequency (Hz), and in the present embodiment, for example, as shown in Expression (4), Fs is 10 times the inter-vane pass frequency F.

Here, for example, in a case where the diameter D is 35 mm, the number n of the vanes 13 is 11, and the rotation speed N is 28,000 rpm, the peripheral speed V of the tip portion is 51.3 m/s, the inter-vane pass frequency F is 5,100 Hz, and the sampling frequency Fs is 51 kHz. Accordingly, it is possible to sample the vane peak by setting the sampling frequency of ADC 37 to 50 kHz.

Figure 5:
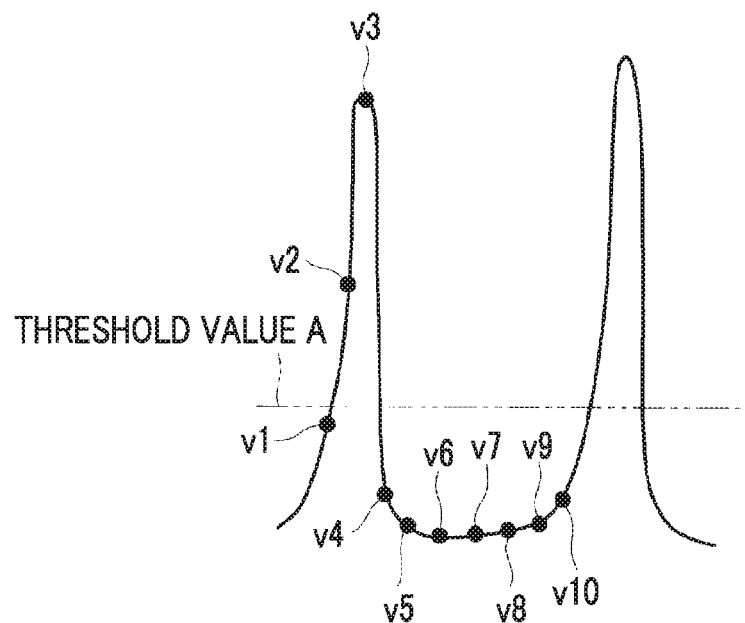
FIG. 5 is a schematic diagram showing an example of low-speed sampling according to the embodiment of the present invention.

FIG. 5 shows an example of the low-speed sampling. Black dots on a waveform shown in FIG. 5 indicate examples of the detection signals sampled by the ADC 37 according to the present embodiment. As shown in FIG. 5, 10 detection signals (v1 to v10) can be sampled by the low-speed sampling with respect to the waveform showing each vane 13 and its surroundings. Among the detection signals, two (v2 and v3) exceed the threshold value A and are vane detection signals indicating the vane 13. In addition, since the detection signals v1 and v4 to v9 are less than the threshold value A, the detection signals v1 and v4 to v9 are non-vane detection signals.

However, if the detection signal is digitized by the low-speed sampling, the digitized vane detection signal does not necessarily indicate the vane peak, and a detection signal indicating a vane position deviated from the vane peak is likely to be digitized.

That is, it is preferable to sample the detection signal indicating the vane peak. However, in the low-speed sampling, like the detection with respect to the vane 13 shown by a broken line in FIG. 6, the detection signal in which the center (also referred to as an abdominal) of the vane 13 is detected is likely to be sampled.

In this way, if the state of the compressor impeller 12 is determined in a state where the vane detection signal considered not to be for the vane peak is included, the determination is likely to be erroneously performed.

Accordingly, the extraction unit 40 included in the determination unit 39 compares each vane detection signal with vane detection signals corresponding to other vanes 13 and the non-vane detection signal, and extracts a vane detection signal (hereinafter, referred to as a "vane peak detection signal") considered to be for a vane peak.

For example, in a comparison method performed by the extraction unit 40, a difference between the vane detection signal and the non-vane detection signal is calculated for each vane detection signal as a height (hereinafter, referred to as a "vane height") of the vane 13, and the vane peak detection signal is extracted on the basis of the vane height indicated by each vane detection signal. Meanwhile, since detection frequency with respect to the non-vane detection signal increases, the number of times of the non-vane detection signals is not counted. By not counting the non-vane detection signals, erroneous determination is not performed.

For example, as a calculation method of the vane height, there is a method of setting a difference between the lowest value of the non-vane detection signal and each vane detection signal to the vane height of the vane detection signal or a method of setting a difference between an average value of the non-vane detection signals and each vane detection signal to the vane height of each vane detection signal.

In addition, the extraction unit 40 according to the present embodiment weights the vane detection signal when extracting the vane peak detection signal. Specifically, less weighting is applied to the vane detection signal as a deviation amount from the vane detection signal indicating the highest vane height increases.

The weighting will be described with reference to FIG. 4.

As shown on the right side of the paper surface in FIG. 4, the extraction unit 40 obtains the number of times for each value (vane height) indicated by the vane detection signal and for each value indicated by the non-vane detection signal, which are performed by a plurality of times of sampling. The extraction unit 40 determines a weighting factor such that the highest value of the vane detection signal becomes the greatest weight and the lowest value of the vane detection signal becomes the smallest weight, on the basis of the number of times.

That is, since the compressor impeller 12 rotates while being slightly vibrates, even when the vane detection signal detects the vane peak, variations in the size occur (amplitude of the vane peak shown by a broken line in FIG. 4). Accordingly, there is a case where it is not clear whether the vane detection signal having a small vane height is the detection result of the vane peak or is the detection result of the abdominal of the vane 13. Accordingly, the number of times (frequency) of the value of the vane height is obtained, a weighting factor for each value of the vane detection signal is determined on the basis of the number of times, and the determined weighting factor is multiplied by the value of each vane detection signal.

That is, it is considered that the vane detection signals corresponding to the value of the maximum number of times and the value larger than the maximum number of times indicate the vane peak. Accordingly, as a vane detection signal is smaller than the value of the maximum number of times, a possibility that the vane detection signal does not indicate the vane peak is higher. In order to clarifying this relationship, weighting is applied to the vane detection signal, and extraction of the vane peak detection signal is easily performed.

Moreover, as described above, the weighting factor is determined such that the highest value of the vane detection signal becomes maximum and the lowest value of the vane detection signal becomes minimum. However, the weighting factor is determined such that a difference between the weight corresponding to the value of the maximum number of times and the weight corresponding to the highest value decreases and a difference between the weight corresponding to the value of the maximum number of times and the weight corresponding to the lowest value increases.

In addition, for example, the extraction unit 40 does not consider the vane detection signal in which the value to which the weighting factor is multiplied is equal to or less than a predetermined threshold value as the vane peak detection signal, and extracts the vane detection signal exceeding the threshold value as the vane peak detection signal.

In the example of FIG. 4, the vane detection signal with respect to the vane 13 of N1 is a detection signal which is considered to not be detection for the vane peak.

FIG. 7 is a flowchart showing a flow of impeller state determination processing according to the present embodiment performed by the digital signal processing unit 33.

First, in Step 100, the detection signal output from the gap sensor 21 is converted from an analog signal into a digital signal at low-speed sampling by the ADC 37.

Next, in Step 102, a predetermined number of the detection signals required for performing a state determination of the compressor impeller 12 are subjected to low-speed sampling, and the sampled detection signals are stored in the store means. For example, here, the predetermined number is a number corresponding to one rotation of the compressor impeller 12, and in the present embodiment, is 11.

Next, in Step 104, whether or not the predetermined number of detection signals is sampled is determined, and in a case of an affirmative determination, the process proceeds to Step 106. Meanwhile, in a case of a negative determination, the process returns to Step 100, and Steps 100 and 102 are repeated until the predetermined number of detection signals is sampled.

In Step 106, the separation unit 38 separates a vane detection signal $v_n$ from the detection signal subjected to low-speed sampling.

Next, in Step S108, based on the value (vane height) indicated by the vane detection signal $v_n$ and the number of times for each vane height indicated by the vane detection signal $v_n$, the weighting factor $w_n$ for each vane detection signal $v_n$ is determined.

Next, in Step 110, the vane detection signal $v_n$ is multiplied by the corresponding weight factor $w_n$.

Next, in Step S112, the vane peak detection signal is extracted from the vane detection signal $v_n$ multiplied by the weighting factor $w_n$.

Moreover, the processing of Steps 108 to 112 is performed by the extraction unit 40.

Next, in Step 114, based on the extracted vane peak detection signal, the shaft vibration determination unit 41 performs shaft vibration determination processing, the tip clearance determination unit 42 performs the tip clearance determination processing, and the state of the compressor impeller 12 is determined.

Moreover, after this determination ends, the processing returns to Step 100, and the impeller state determination processing is performed on the basis of the detection signal which is newly subjected to low-speed sampling.

FIG. 8 is a flowchart showing a flow of the shaft vibration determination processing according to the present embodiment performed by the shaft vibration determination unit 41.

First, in Step 200, the maximum value $v_{max}$ and the minimum value $v_{min}$ of the vane peak detection signal are derived.

Next, in Step 202, a difference between the maximum value $v_{max}$ and the minimum value $v_{min}$ of the vane peak detection signal is calculated as a vibration component $A_n$.

Next, in Step 204, the vibration component $A_n$ and a predetermined reference vibration component AA are compared with each other, whether or not the vibration component $A_n$ exceeds the reference vibration component AA is determined, and in a case of the affirmative determination, the process proceeds to Step 206. Meanwhile, in a case where the vibration component $A_n$ does not exceed the reference vibration component AA, the shaft vibration determination processing ends, and the process returns to Step 100.

The reference vibration component AA is a threshold value for detecting abnormal vibrations of the rotary machine, and if the vibration component $A_n$ reaches the reference vibration component AA, for example, notification of alarm or automatic stop of the rotary machine is performed. That is, the reference vibration component AA is an alarm setting value or an automatic stop setting value of the rotary machine. In addition, a plurality of reference vibration components AA different from each other may be set, and every time the vibration component An increases and reaches the plurality of reference vibration components AA, notification of alarm or automatic stop of the rotary machine may be performed in stages.

In Step 206, the shaft vibration is excessive, and notification of warning is performed. Accordingly, a worker stops an apparatus including the turbocharger 1 or repairs the turbocharger 1 when the turbocharger 1 is inspected next time.

FIG. 9 is flowchart showing a flow of the tip clearance determination processing according to the present embodiment performed by the tip clearance determination unit 42.

First, in Step 300, the maximum value $v_{max}$ of the vane peak detection signal is derived. The maximum value $v_{max}$ is a clearance $B_n$ corresponding to the tip clearance.

Next, in Step 302, the clearance $B_n$ and a predetermined reference clearance BB are compared with each other, whether or not the clearance $B_n$ exceeds the reference clearance BB is determined, and in a case of the affirmative determination, the process proceeds to Step 304. Meanwhile, in a case where the clearance $B_n$ does not exceed the reference clearance BB, the tip clearance determination processing ends, and the process returns to Step 100.

The reference clearance BB is a threshold value for detecting the vane 13 approaching the compressor casing 14, and if the clearance $B_n$ reaches the reference clearance BB, for example, notification of alarm or automatic stop of the rotary machine is performed. That is, the reference clearance BB is an alarm setting value or an automatic stop setting value of the rotary machine. In addition, a plurality of reference clearances BB different from each other may be set, and every time the clearance $B_n$ increases and reaches the plurality of reference clearances BB, notification of alarm or automatic stop of the rotary machine may be performed in stages.

In Step 304, notification of warning is performed in a case where there is a possibility that the vane 13 comes into contact with the compressor casing 14. Accordingly, a worker stops an apparatus including the turbocharger 1 or repairs the turbocharger 1 when the turbocharger 1 is inspected next time.

As described above, the state observation device 30 according to the present embodiment observes the rotation speed of the compressor impeller 12 using the gap senor 21 which detects the distance between the compressor impeller 12 and the gap sensor 21.

In addition, in the state observation device 30, the detection signal is digitized by the gap sensor 21 at the low-speed sampling period performed by the ADC 37, and the digitized detection signal is separated into the vane detection signal considered to be for detection of the vane 13 of the compressor impeller 12 and the non-vane detection signal considered not to be for detection of the vane 13 by the separation unit 38. In addition, the vane detection signal and the vane detection signals corresponding to other vanes 13 and the non-vane detection signal are compared with each other by the determination unit 39, the vane peak detection signal considered to be for the vane peak is extracted, and the shaft vibration and the tip clearance which are states of the compressor impeller 12 are determined on the basis of the extracted vane peak detection signal.

In this way, in the state observation device 30 according the present embodiment, the vane detection signals and the non-vane detection signals of the plurality of vanes 13 are relatively compared with each other, the vane peak detection signal considered to be for the vane peak is extracted, and the state of the compressor impeller 12 is determined. Accordingly, since it is enough for the detection signal indicating the distance to the vane 13 to be sampled at least once for each vane 13, to the state observation device 30 can observe the state of the turbocharger 1 without performing high-speed sampling.

Hereinbefore, the present invention is described with reference the above-described embodiment. However, a technical scope of the present invention is not limited to the range described in the embodiment. Various modifications or improvements can be applied to the embodiment within a scope which does not depart from the gist of the present invention, and the aspects to which the modifications or the improvements are added also are included in the technical scope of the present invention. In addition, the above-described embodiments may be appropriately combined.

For example, in the above-described embodiment, the aspect in which one gap sensor 21 is provided in the compressor casing 14 is described. However, the present invention is not limited to this, and an aspect in which a plurality of gap sensors 21 are provided at positions at which the phases are deviated from each other may be adopted.

For example, in the above-described embodiment, the aspect in which the rotary machine according to the present invention is the turbocharger 1 is described. However, the present invention is not limited to this, and other rotary machines may be adopted as long as the rotary machine includes the impeller.

In addition, the flow of each processing described in the above-described embodiment is an example, an unnecessary step may be omitted, a new step may be added, or a processing sequence may be replaced within a scope which does not depart from the gist of the present invention.

REFERENCE SIGNS LIST

1: turbocharger
12: compressor impeller
21: gap sensor
30: state observation device
37: analog-digital convertor (ADC)
38: separation unit
39: determination unit
40: extraction unit

The invention claimed is:

1. A rotary machine state observation device, comprising:
a gap sensor to detect a distance between an impeller of a rotary machine and the gap sensor, the gap sensor being provided at an interval in a radial direction between the impeller and the gap sensor;
an analog-to-digital converter (ADC) to convert a detection signal from an analog signal into a digital signal, the detection signal being detected by the gap sensor at a predetermined sampling period; and
a digital signal processor to:
compare the detection signal converted by the ADC with a threshold value;
separate the detection signal equal to or more than the threshold value as a vane detection signal considered to be for detection of a vane of the impeller and the detection signal less than the threshold value as a non-vane detection signal considered not to be for detection of the vane;
extract a vane detection signal considered to be for a peak of the vane by a comparison of the vane detection signal with vane detection signals that correspond to other vanes and the non-vane detection signal; and
determine a state of the impeller on the basis of the extracted vane detection signal.

2. The rotary machine state observation device according to claim 1,
wherein the digital signal processor is to apply less weight to the vane detection signal as a deviation amount from the vane detection signal indicating the highest value increases.

3. The rotary machine state observation device according to claim 1, wherein the predetermined sampling period is determined on the basis of a time interval at which one vane passes through a position facing the gap sensor.

4. A rotary machine, comprising:
   an impeller;
   a casing which accommodates the impeller; and
   the state observation device according to claim 1.

5. A rotary machine state observation method, comprising:
   detecting, via a gap sensor, a distance between an impeller of a rotary machine and the gap sensor, the gap sensor being provided at an interval in a radial direction between the impeller and the gap sensor;
   converting, via an analog-to-digital converter (ADC), a detection signal from an analog signal into a digital signal, the detection signal being detected by the gap sensor at a predetermined sampling period;
   comparing, via a digital signal processor, the detection signal converted by the ADC with a threshold value;
   separating, via a digital signal processor, the detection signal equal to or more than the threshold value as a vane detection signal considered to be for detection of a vane of the impeller and the detection signal less than the threshold value as a non-vane detection signal considered not to be for detection of the vane;
   extracting, via the digital signal processor, a vane detection signal considered to be for a peak of the vane by comparing the vane detection signal with vane detection signals corresponding to other vanes and the non-vane detection signal; and
   determining, via the digital signal processor, a state of the impeller on the basis of the extracted vane detection signal.

\* \* \* \* \*